United States Patent [19]
Robinson

[11] 4,147,463
[45] Apr. 3, 1979

[54] ADJUSTABLE DEBURRING TOOL

[76] Inventor: William R. Robinson, 25435 Liberty La., Farmington Hills, Mich. 48018

[21] Appl. No.: 838,701

[22] Filed: Oct. 3, 1977

[51] Int. Cl.² .............................................. B23B 51/00
[52] U.S. Cl. .................................. 408/156; 408/180; 408/187; 408/714
[58] Field of Search ............... 408/154, 156, 180, 187, 408/188, 714, 213, 231

[56] References Cited

U.S. PATENT DOCUMENTS

| 1,008,363 | 11/1911 | Pica | 408/154 |
| 3,172,309 | 3/1965 | Cogsdill | 408/150 |

FOREIGN PATENT DOCUMENTS

| 1276955 | 6/1972 | United Kingdom | 408/187 |

Primary Examiner—Harrison L. Hinson
Attorney, Agent, or Firm—Reising, Ethington, Barnard, Perry & Brooks

[57] ABSTRACT

A deburring tool including an elongated arbor formed with a cutting blade recess. A unitary cutting tool has a cutting head with an elongated, flat, resilient blade extending therefrom. The blade is received in the recess, and the end of the blade opposite the cutting head is secured to the arbor by a pin and an adjustable screw with the cutting head projecting from the recess. Rotation of the screw causes pivotal adjustment of the blade to in turn adjust the unstressed position of the cutting head with respect to the recess. The portion of the blade that extends from the pin to the cutting head is yieldable to permit the cutting head to move resiliently inwardly with respect to the recess.

5 Claims, 5 Drawing Figures

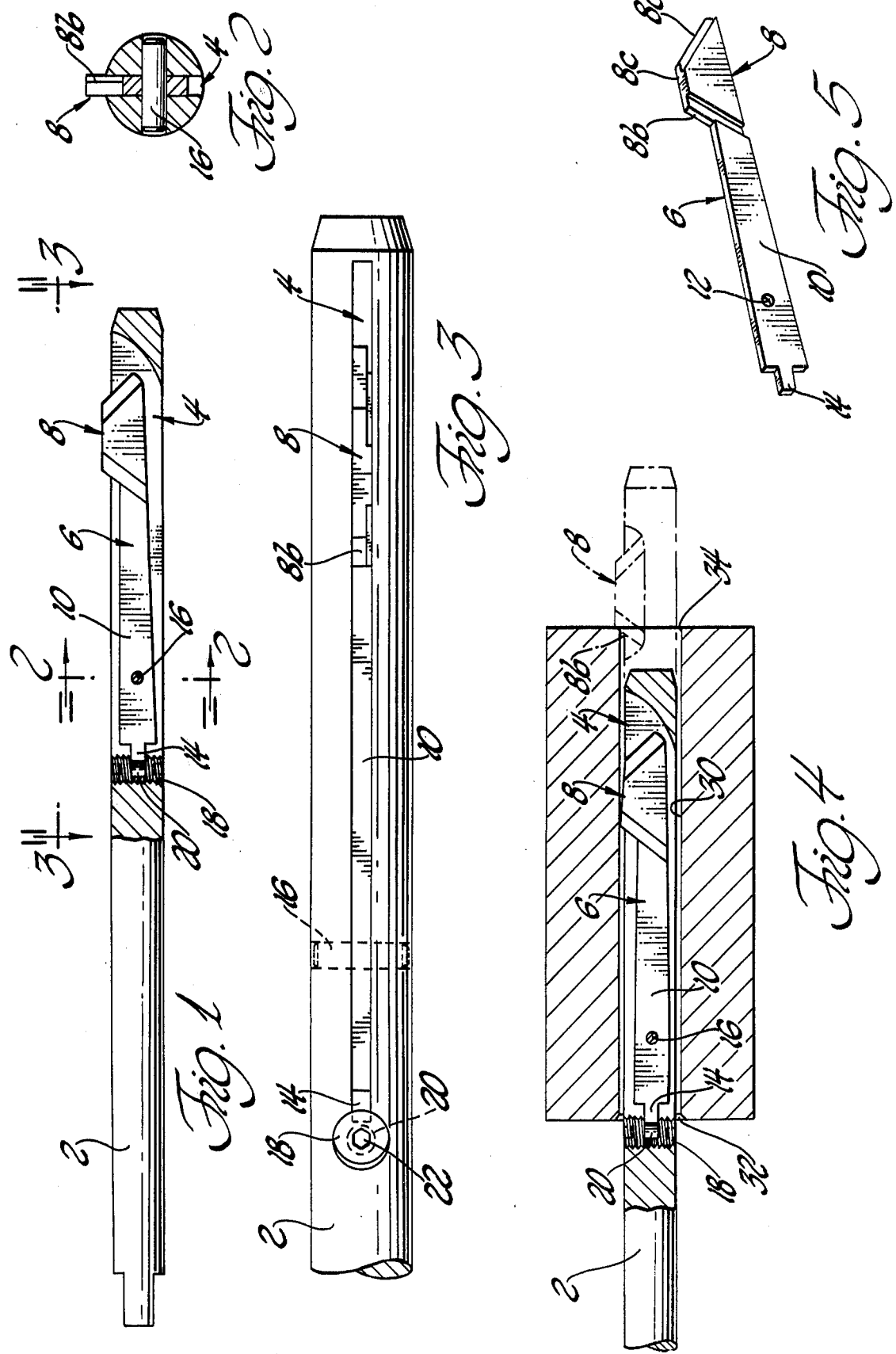

4,147,463

ADJUSTABLE DEBURRING TOOL

BACKGROUND OF THE INVENTION

1. Field of the Invention

This invention relates to deburring tools, and is particularly concerned with the construction of a deburring tool having a replaceable and adjustable cutting head.

2. Description of the Prior Art

This invention constitutes an improvement over the invention disclosed in the co-pending application Ser. No. 785,489 filed Apr. 7, 1977 and now U.S. Pat. No. 4,086,018. In the latter patent, a deburring tool is disclosed having an elongated cylindrical body, or arbor formed with a cutting blade recess. A unitary cutting tool is received in the recess, and comprises a cutting head with an integral, elongated, flat, resilient blade extending therefrom. The blade is mounted in the arbor by a pair of axially spaced pins which extend transversely through the recess and spaced openings in the blade. Thus, the end of the blade opposite the cutting head to the arbor is mounted in nonpivotal relationship with respect to the arbor with the cutting head projecting from the recess for engaging the workpiece. The portion of the blade between the mounting pins and the cutting head is resiliently yieldable to permit the cutting head to move inwardly with respect to the recess during a deburring operation.

In addition to the above referred to cop-pending application Ser. No. 785,489, reference may be had to prior art devices disclosed in U.S. Pat. Nos. 68,307 (1867); 1,458,171; 2,657,597; 2,676,406; 2,895,356; 3,087,359; 3,298,256; 3,306,136; 3,411,386; 3,420,125 and 3,720,477.

SUMMARY OF THE INVENTION

An object of this invention is to provide an improved, adjustable deburring tool having a unitary cutting tool nonpivotally mounted in a cutting tool recess in an arbor, the cutting tool having an integral, resilient blade for biasing the cutting head to an operable position extending from the recess wherein the blade can be selectively pivotally adjusted with respect to the arbor to in turn adjust the unstressed position of the cutting head with respect to the arbor.

In carrying out the foregoing, and other objects, a deburring tool according to the present invention includes an elongated cylindrical body, or arbor, formed with a cutting blade recess. Received in the recess is a unitary cutting tool having a cutting head with an integral, elongated, flat resilient blade extending therefrom. Mounting means secures the end of the blade opposite the cutting head to the arbor in such a manner that the cutting blade projects from the recess with the portion of the blade extending from the mounting means being yieldable to permit the cutting head to move inwardly with respect to the recess. In order to adjust the unstressed position of the cutting head with respect to the arbor, the mounting means comprises a pin mounted in the arbor and extending transversely through the recess and the blade, and an adjustable screw threadedly mounted in the arbor at a location spaced from the pin with its axis extending transversely of the arbor and normal to the axis of the pin. The blade is connected with the screw in such a manner that rotation of the screw in the arbor pivotally adjusts the blade to in turn adjust the unstressed position of the cutting head with respect to the arbor.

Other objects, advantages and features of the invention will become apparent from the following description taken in connection with the accompanying drawings.

DESCRIPTION OF THE DRAWINGS

FIG. 1 is an elevational view, partially in section, of a deburring tool embodying the present invention;

FIG. 2 is a sectional view taken on lines 2—2 of FIG. 1;

FIG. 3 is a top view, slightly enlarged, of the deburring tool of FIG. 1 as viewed along lines 3—3 in FIG. 1;

FIG. 4 is a sectional view of the deburring tool and a workpiece with the cutting head of the deburring tool shown in an intermediate position within the hole of the workpiece in full lines, and in the reverse deburring position in phantom lines; and FIG. 5 is a perspective view of the cutting tool of the deburring tool shown in FIGS. 1-4.

DESCRIPTION OF THE PREFERRED EMBODIMENT

In the drawings, an elongated cylindrical body or arbor is designated by reference numeral 2. The arbor 2 is formed with a cutting tool recess or slot 4, the recess 4 extending diametrically through the cylindrical arbor 2 as shown in FIG. 2. Mounted in the arbor 2 is a unitary cutting tool 6 having a cutting head 8 with an elongated, resilient, flat blade 10 extending rearwardly, or toward the left as viewed in FIG. 1 of the drawings, from the cutting head 8. The blade 10 is received in the recess 4 with the flat sides of the blade in parallel relationship with the sides of the recess 4.

The blade 10 is formed with an opening 12 and a mounting tab 14 projects rearwardly from the end of the blade opposite the cutting head 8. Mounting means in the form of a pin 16 and an adjustment screw 18 extend through the arbor to secure the end of the blade opposite the cutting head 8 to the arbor 2, the pin 16 extends through the arbor transversely of the recess 4 and through the opening 12. The adjustable screw 18 is threadedly mounted in the arbor at a location spaced from the pin 16 with its axis extending normal to the axis of the pin 16 and transversely of the arbor. The screw 18 is formed with a central, nonthreaded portion 20 defining an annular groove which receives the mounting tab 14 projecting from the end of the blade 10. The mounting tab 14 projects into engagement with the adjustment screw 18. A hexagonal tool recess is formed in the ends of the screw 18 for receiving a tool to rotatably adjust the screw 18. Rotation of the screw 18 in the arbor 2 causes the blade 10 to pivot about the pin 16 to adjust the unstressed position of the cutting head with respect to the arbor 2.

With the blade 10 adjusted to the desired unstressed position by the screw 18, the cutting head 8 is supported by the blade 10 in an operable position in which it projects from the recess 4 in the unstressed condition of the blade 10 (the position illustrated in FIG. 1); however, the portion of the blade 10 extending from the pin 16 to the cutting head 8 is resiliently yieldable so that the cutting head 8 can move inwardly with respect to the recess 4 as is illustrated in FIG. 4.

The cutting head 8 includes a top, noncutting surface 8c with a leading cutting edge 8a and a trailing cutting edge 8b extending angularly from the opposite ends of the top edge 8c.

FIG. 3 illustrates a workpiece W in cross section formed with a hole 30. The hole 30 may be formed by drilling or some other operation. The hole 30 has a leading end 32 and a trailing end 34. At the beginning of the deburring operation, the arbor 2, mounted in a rotating chuck or tool holder, is rotated and advanced toward the right as viewed in FIG. 3 with the leading cutting edge 8a engaging the leading end 32 of the hold 30 to remove burrs and form a slight chamfer as indicated by reference numeral 32 in FIG. 4. The arbor first engages the end 32 of the hole 30 and advances to the right to the phantom line position illustrated in FIG. 4. The top, noncutting edge 8c resiliently engages the wall of the hole 30 as the blade moves toward the right through the hole 30 as viewed in FIG. 4. When the cutting head 8 clears the trailing end of the hole 30 at 34, as indicated in phantom lines in FIG. 4, the direction of movement of the tool is reversed and the trailing cutting edge 8b removes burrs and slightly chamfers the trailing end of the hole 30 of the workpiece W. As the blade is moved toward the left in FIG. 4, the engagement of the trailing edge 8b with the end 34 of the hole 30 causes the blade 10 to yield and permit the cutting head 8 to assume the full line position shown in FIG. 4 as the tool is withdrawn toward the left from the hole 30 of the workpiece W. The amount of pressure applied by the cutting edges 8a and 8b is determined by the resiliency of the blade 10 and the unstressed position of the cutting head 8 as determined by the adjustment screw 18.

Rotation of the screw 18 in a direction to move the blade 10 counterclockwise about the pin 16, as viewed in FIG. 1, increases the distance that the cutting head projects from the recess 4 in its unstressed condition. Conversely, by adjusting the screw 18 upwardly in FIG. 1, or in the direction to pivot the blade 10 clockwise about pin 16, the distance the cutting head 8 projects from the arbor, is decreased, and hence the amount of deflection of the blade 10 necessary to move the cutting head into the recess 4 is decreased.

The cutting tool 6 can be removed and replaced simply by removing the pin 16. The mounting tab 14 of the cutting tool 6 is inserted into the groove of the screw 18 defined by the non-threaded portion 20. Pin 16 is then inserted into the arbor to secure the cutting tool 6 in place. The unstressed position of the cutting head 8 with respect to the arbor 2 is determined by rotation of the screw 18. After adjustment of the screw 18, the cutting tool 6 is mounted in nonpivotal relationship with respect to the arbor 2 so that pressure applied to the cutting head 8 causes blade 10 to yield.

While a specific form of the invention is described in the foregoing specification and illustrated in the accompanying drawings, the invention is not limited to the exact construction shown. To the contrary, alterations in the construction and arrangement of parts, all falling within the scope and spirit of the invention, will be apparent to those skilled in the art.

What is claimed is:

1. A deburring tool comprising:
   an elongated arbor formed with a cutting blade recess; a unitary cutting tool having a cutting head with an elongated, flat, resilient blade extending therefrom and received in said recess; and mounting means securing the end of said blade opposite said cutting head to said arbor with said cutting blade projecting from said recess and the portion of said blade extending from said mounting means being yieldable to permit said cutting head to move inwardly with respect to said recess, said mounting means comprising a pin mounted in said arbor and extending transversely through said recess and said blade to define a pivot point about which said cutting tool can pivot, and an adjustable screw threadedly mounted in said arbor at a location spaced from said pin with its axis extending transversely of said arbor and normal to said pin, said blade being connected with said screw such that rotation of said screw in said arbor pivotally adjusts said blade about said pivot point to adjust the unstressed position of said cutting head with respect to said arbor.

2. A deburring tool as claimed in claim 1 wherein said blade has a mounting tab formed at its end opposite said cutting head, and wherein said adjustable screw has an annular groove receiving said mounting tab.

3. A deburring tool as claimed in claim 2 wherein said groove in said adjustable screw is formed by a nonthreaded portion intermediate the ends of said screw.

4. A deburring tool as claimed in claim 3 wherein said adjustable screw is threadedly mounted in said arbor adjacent the inner end wall of said recess.

5. A deburring tool as claimed in claim 4 wherein said cutting head has a top, noncutting edge and leading and trailing cutting edges extending angularly from opposite ends of said top edge.

* * * * *